Patented May 21, 1946

2,400,802

UNITED STATES PATENT OFFICE 2,400,802

SEPARATION OF AROMATIC HYDROCARBONS FROM HYDROCARBON MIXTURES

George B. Arnold, Beacon, N. Y., assignor, by mesne assignments, to The Texas Company, New York, N. Y., a corporation of Delaware No Drawing. Application March 8, 1941, Serial No. 382,327

6 Claims. (Cl. 196—13)

This invention relates to the separation of aromatic hydrocarbons from hydrocarbon mixtures and particularly from hydrocarbon mixtures such as derived from petroleum which contain aromatic and non-aromatic hydrocarbons including aliphatic and alicyclic hydrocarbons.

The invention broadly contemplates separating aromatic hydrocarbons from mixtures containing them by extraction with a solvent comprising a mixture of water and an auxiliary substance or agent soluble in the water at the temperature of extraction, and by effecting the extraction at a temperature considerably above the normal boiling point of the aqueous mixture and under a pressure sufficient to maintain the solvent and hydrocarbons substantially in the liquid phase during the extraction. As a result of the extraction a solvent phase is formed comprising aromatic hydrocarbons dissolved in the major portion of the solvent liquid while a hydrocarbon phase is formed comprising non-aromatic and other hydrocarbons mixed with a minor portion of the solvent. The two phases are separated and separately subjected to cooling and settling, with or without substantial reduction in pressure, so that separation between hydrocarbons and solvent occurs. The separated hydrocarbons are withdrawn, while the solvent from which the hydrocarbons have been separated is recycled, advantageously, for extracting fresh feed mixture.

The auxiliary substance is one which increases the solubility of aromatic hydrocarbons in the solvent mixture without substantially reducing the selectivity of the mixture as between aromatic and non-aromatic constituents of the feed hydrocarbon mixtures. Suitable auxiliary substances comprise hydroxy and polyhydroxy organic compounds which are substantially completely soluble in water at least at temperatures of the order of 70 to 600° F.

Dihydroxy saturated and unsaturated alcohols such as ethylene glycol, polyethylene glycols, trimethylene glycol, butylene glycol, and poly-olefin glycols are effective for this purpose. Among the polyethylene glycols that may be used are di-, tri-, tetra-, penta- and hexaethylene glycol. The halogenated derivatives of the dihydroxy alcohols such as trimethylenechlorohydrin, glycerol alpha and beta dichlorohydrins and ethylene chlorohydrin may be used. Mono ethers and diethers of ethylene glycol and polyethylene glycol, such as ethylene glycol mono methyl ether and ethylene glycol diethyl ether, may be used.

Other organic compounds which may be used include saturated and unsaturated alcohols such as ethyl alcohol, poly-vinyl alcohols, and low molecular weight unsaturated alcohols like allyl alcohol. Poly-hydroxyl alcohols such as glycerine, mannitol and sorbitol are also contemplated. Phenolic compounds such as phenol, resorcinol, phloroglucinol and pyrogallol and substituted derivatives thereof may be used. Still other compounds include the hydroxy acids such as salicylic and lactic acids, and salts thereof, and the aliphatic alcohols including amino and nitro derivatives thereof, such as mono, di, and tri ethanol amines and 2-nitro ethanol.

The proportion of added substance which may be employed is such that the mixture of water and secondary solvent will exert substantial solvent action upon aromatic hydrocarbons at temperatures of 200° F. and above but will exert substantially little solvent action upon aromatic hydrocarbons at ordinary temperatures, for example, from about room temperature to about 150° F. In other words, the proportion of secondary solvent and water in the solvent mixture is such that when the solution of desired aromatic hydrocarbons in the solvent is separated from the extraction zone the desired aromatic hydrocarbons can be substantially entirely separated from the solvent merely by reducing the temperature of the solution to a temperature in the range of about 70 to 150° F.

Thus, the proportion of above-mentioned hydroxy material contained in the water may range from a fraction of a per cent to 50% or more by weight of the solvent mixture and preferably will range from about 5 to 25% by weight.

The invention has particular application to the extraction of aromatics such as benzol, toluol and xylol or higher aromatic hydrocarbons and polynuclear aromatics such as naphthalene, phenanthrene and anthracene from hydrocarbon fractions derived from petroleum or obtained in the thermal or catalytic treatment of petroleum hydrocarbons. For example, it is useful in extracting benzol and toluol from cracked naphtha produced in either catalytic or pyrolytic cracking of hydrocarbons. Other naphtha or hydrocarbon mixtures to which the invention may be applied comprise hydroformed naphtha, pyrolytically or catalytically reformed naphtha, polyformed naphtha and the like. It is also applicable to the extraction of aromatic hydrocarbons from straight run naphthas or gasolines such as distilled from certain crudes.

In employing the invention for the extraction of toluene from cracked naphtha or a hydrocarbon fraction rich in toluene the hydrocarbon mixture is subjected to treatment with solvent at a temperature of about 200 to 600° F. and preferably in the range of 450 to 525° F. The treatment is effected under sufficient pressure to maintain the hydrocarbons and solvent substantially in the liquid phase and this pressure may range from about 1000 to 5500 pounds per square inch gauge. Under these conditions the solvent exerts a substantial solvent action for toluene and relatively low solvent action upon olefinic, naphthenic and paraffinic constituents of the feed mixture.

As a result there is formed an extract or solvent phase comprising toluene dissolved in the main body of solvent and a raffinate or hydrocarbon phase comprising non-aromatic hydrocarbons including olefins, naphthenes and paraffins. These phases are separately discharged from the extraction zone and upon cooling to room temperature or thereabouts, in the range 70 to about 150° F. for example, separation between hydrocarbons and solvent occurs. The separated hydrocarbons are separately discharged from the system and the solvent can be used for the extraction of fresh feed mixture.

The proportion of solvent to hydrocarbon feed employed in the extraction may be varied over a wide range as desired and it has been found, for example, that an effective separation of toluene from a mixture of gasoline hydrocarbons can be secured under the above conditions of temperature and pressure when treating the feed mixture with solvent in the proportion of about 5 to 20 parts of solvent to feed hydrocarbon mixture. It is contemplated, of course, that the proportion of solvent may be either less than or greater than this range.

An important advantage of the invention is that when extracting aromatic hydrocarbons from hydrocarbon mixture such as cracked naphtha and which contain olefins, the ratio of olefin to aromatic hydrocarbons in the resulting extract is low. This is of particular advantage with regard to the production of toluene in pure form.

By way of example and as indicating the results obtained in single batch extractions a synthetic hydrocarbon mixture was extracted with distilled water and also with distilled water containing different amounts of ethylene glycol.

The extractions were made at a temperature of 525° F. and under a pressure of 1800 pounds per square inch gauge. The synthetic mixture contained 20% toluene, 20% olefins and 60% paraffins by weight.

The toluene used in the mixture had a specific gravity of 0.8613 at 68° F. relative to water at 39.2° F. The olefins used in the mixture comprised a fraction having a boiling range of 200 to 250° F. separated from polymer naphtha obtained in the catalytic polymerization of normally gaseous olefins. This olefin fraction had a specific gravity at 68° F. relative to water at 39.2° F. of 0.7228. The paraffins comprised a fraction having a boiling range of from 200 to 250° F. separated from a gasoline obtained by catalytically alkylating gaseous isoparaffins and olefins. The paraffin fraction is characterized by having a specific gravity of 0.7063 at 68° F. relative to water at 39.2° F.

In each case the solvent was mixed with the synthetic mixture in the proportion of 6.9 parts of solvent to 1 part of hydrocarbon mixture by weight. The resulting solvent and hydrocarbon phases were separated under pressure. The separately withdrawn solvent or extract phase was cooled to about room temperature so that the dissolved extract hydrocarbon separated from the solvent. The toluene content of the solvent free extract hydrocarbons was determined by calculations based on the densities of the solvent free extract and the components of the feed.

The results obtained in each experiment were as follows:

| Solvent composition per cent by weight: | | | | | |
|---|---|---|---|---|---|
| Water | 100 | 90 | 85 | 75 | 50 |
| Ethylene glycol | 0 | 10 | 15 | 25 | 50 |
| Yield, approximate: | | | | | |
| Hydrocarbons contained in extract phase, per cent by weight | 6 | 8 | 9.7 | 11.6 | 13 |
| Toluene content of extract hydrocarbons, per cent by weight | 86 | 74 | 73 | 73 | 66 |
| Per cent toluene in the extract basis toluene in the charge | 25 | 30 | 35 | 42 | 42 |

As the foregoing tabulated data indicate the addition of ethylene glycol to the water increases the amount of hydrocarbons dissolved in the extract phase so that more toluene is contained in the extract. However, the ratio of toluene to other hydrocarbons in the extract solution decreases somewhat with increasing amounts of ethylene glycol. Where the solvent contains from 10 to 25% ethylene glycol this ratio remains substantially the same but decreases quite substantially where the water contains as much as 50% by weight of ethylene glycol. In other words, the optimum results appear to be obtained with an aqueous mixture containing up to about 15 to 25% by weight of ethylene glycol.

Another experiment was made in which a low boiling fraction of hydroformed naphtha derived from West Texas crude was extracted with water containing 25% ethylene glycol by weight. The naphtha fraction in question had a boiling range of about 199 to 250° F., a specific gravity of 0.7820 at 68° F. relative to water at 39.2° F. and a bromine addition number of 11.

This fraction was extracted at 525° F. and under a pressure of 1600 pounds per square inch gauge, using five parts of aqueous solvent to one part of naphtha by volume.

The hydrocarbons dissolved and removed as extract in the solvent amounted to 17% by volume of the hydroformed naphtha fraction. After removal of the water the solvent-free extract was found to have a specific gravity of 0.8498 at 68° F. relative to water at 39.2° F. and a bromine number of 4, indicating that it consisted of approximately 90% by weight of toluene and contained very little olefinic material.

The undesired or raffinate portion of the hydroformed naphtha fraction, after removal of retained solvent, was found to have a specific gravity of 0.7597 at 68° F. relative to water at 39.2° F. and was characterized by having a bromine number of 12, showing that there was a greater concentration of olefinic constituents in the undissolved hydrocarbons.

While batch extractions have been described it is contemplated that the extraction may be carried out in a continuous operation employing concurrent or countercurrent flow in conventional single or multistage extraction apparatus comprising packed towers or combinations of mixing and settling vessels.

It is contemplated that in a continuous flow extraction employing conventional continuous flow apparatus a higher degree of separation between aromatic and non-aromatic hydrocarbons would be realized than was obtained in the foregoing batch extractions.

Where it is desired to obtain toluene substantially free from olefins the extract hydrocarbons may be subjected to treatment with a suitable agent such as sulfuric acid for the purpose of removing the olefins. The acid treatment may also be employed for the purpose of removing sulfur compounds such as mercaptans as well as other impurities. Other reagents may be employed for this purpose including solid adsorptive material such as acid treated clay.

In extracting aromatic hydrocarbons such as toluene from naphtha the light naphtha fraction may be subjected to extraction with solvent followed by distillation of the resulting extract hydrocarbons to segregate a fraction rich in the desired aromatic constituents. As an alternative procedure the naphtha may be fractionated to segregate a fraction rich in the desired aromatic constituents, i. e., toluene or consisting essentially of hydrocarbons having a boiling range of about 200 to 250° F. and this fraction then subjected to solvent extraction in order to separate the toluene.

It is contemplated that the naphtha or naphtha fraction rich in the desired aromatics may be subjected to preliminary treatment to remove gum forming bodies and sulfur compounds prior to extraction with solvent. For example, the naphtha or suitable fraction thereof may be passed directly from the fractionating tower of the conversion unit in which the naphtha is produced to a conventional clay treating tower for the removal of diolefins or gum forming bodies. This clay treatment or a separate clay treatment may be carried out at temperatures sufficiently elevated to effect desulfurizing of the hydrocarbon mixture. Thereafter, the treated hydrocarbon mixture is subjected to extraction with solvent to remove the aromatic constituents in a manner similar to that already described. The naphtha hydrocarbons from which the desired aromatics have been extracted can be run to gasoline or motor fuel production.

While the invention has been described in connection with the recovery of aromatic hydrocarbons from naphtha it is contemplated that the invention may be applied in the extraction of other hydrocarbon fractions such as the higher boiling portions of cracked or reformed gasoline and also to kerosene and lubricating oils.

In addition to the foregoing the process has application to the extraction of high antiknock aromatic blending stocks from wide boiling range naphthas or naphtha mixtures. It may also be applied to the treatment of high boiling petroleum fractions to obtain raffinates of desired properties, for example, Diesel fuel having a high cetane number, kerosene having superior burning properties or lubricating oils of high viscosity index.

Obviously, many modifications and variations of the invention, as hereinbefore set forth, may be made without departing from the spirit and scope thereof, and therefore only such limitations should be imposed as are indicated in the appended claims.

I claim:

1. A process for separating toluene from a naphtha feed containing aromatic and non-aromatic hydrocarbons including olefins, paraffins, and naphthenes which comprises separating from said naphtha a hydrocarbon fraction boiling in the range about 200 to 250° F., extracting said fraction with a solvent consisting essentially of water containing about 5 to 25 weight per cent of olefin glycol at an elevated temperature in the range about 450 to 525° F. and under an elevated pressure sufficient to maintain the solvent and hydrocarbons substantially in the liquid phase, forming a solvent phase consisting essentially of solvent and toluene dissolved therein, said solvent phase being substantially free from said non-aromatic hydrocarbons, and a hydrocarbon phase comprising a small amount of solvent mixed with non-aromatic hydrocarbons, separating said phases while still under said elevated pressure and temperature, without substantial reduction in pressure separately cooling said phases to effect separation between hydrocarbons and solvent, separately removing the separated hydrocarbons from the solvent, and recycling the recovered solvent to the extraction.

2. A process for separating toluene from cracked naphtha containing aromatic and non-aromatic hydrocarbons including olefins, paraffins, and naphthenes, and containing gum-forming constituents, which comprises fractionating said naphtha to form a fraction boiling in the range about 200 to 250° F., treating said fraction to remove gum-forming constituents therefrom, extracting the treated fraction with a solvent consisting essentially of water containing about 5 to 25 weight per cent olefin glycol at an elevated temperature in the range about 450 to 525° F. and under an elevated pressure sufficient to maintain the solvent and hydrocarbons substantially in the liquid phase, forming a solvent phase consisting essentially of solvent and toluene dissolved therein, said solvent phase being substantially free from said non-aromatic hydrocarbons, and a hydrocarbon phase comprising a small amount of solvent mixed with non-aromatic hydrocarbons, separating said phases while still under said elevated pressure and temperature, without substantial reduction in pressure separately cooling said phases to effect separation between hydrocarbons and solvent, separately removing the separated hydrocarbons from the solvent, and recycling the recovered solvent to the extraction.

3. A process for separating toluene from cracked naphtha containing aromatic and non-aromatic hydrocarbons including olefins, paraffins, and naphthenes, and containing gum-forming constituents and sulfur compounds which comprises fractionating said naphtha to form a fraction boiling in the range about 200 to 250° F., treating said fraction with clay at an elevated temperature so as to effect removal of gum-forming constituents and sulfur, extracting the treated fraction with a solvent consisting essentially of water containing about 5 to 25 weight per cent olefin glycol at an elevated temperature in the range about 450 to 525° F. and under an elevated pressure sufficient to maintain the solvent and hydrocarbons substantially in the liquid phase, forming a solvent phase consisting essentially of solvent and toluene dissolved therein, said solvent phase being substantially free from non-aromatic hydrocarbons, and a hydrocarbon phase comprising a small amount of solvent mixed with non-aromatic hydrocarbons, separating said phases while still under elevated pressure and temperature, without substantial reduction in pressure separately cooling said phases to effect separation between hydrocarbons and solvent, separately removing the separated hydrocarbons from the solvent, and recycling the recovered solvent to the extraction.

4. A process for separating toluene from cracked naphtha containing aromatic and non-aromatic hydrocarbons including olefins, paraffins, and naphthenes which comprises separating from said naphtha a hydrocarbon fraction boiling in the range about 200 to 250° F., extracting said fraction with a solvent consisting essentially of water containing about 25 weight per cent ethylene glycol in the proportion of about 5 parts of water to 1 part naphtha by volume, effecting said extraction at an elevated temperature of about 525° F. and under an elevated pressure of about 1600 pounds, forming a solvent phase consisting essentially of solvent and toluene dissolved therein, said solvent phase being substantially free from said non-aromatic hydrocarbons, and a hydrocarbon phase comprising a small amount of solvent mixed with non-aromatic hydrocarbons, separating said phases while under said elevated pressure and temperature, without substantial reduction in pressure separately cooling said phases to effect separation between hydrocarbons and solvent, and separately removing the separated hydrocarbons from the solvent.

5. Process according to claim 1 in which the olefin glycol is a poly-olefin glycol.

6. Process according to claim 1 in which the glycol is selected from the group consisting of di-, tri-, tetra-, penta-, and hexa- ethylene glycols.

GEORGE B. ARNOLD.